United States Patent
Leung et al.

(10) Patent No.: US 9,836,406 B2
(45) Date of Patent: Dec. 5, 2017

(54) DYNAMIC VICTIM CACHE POLICY

(71) Applicant: Oracle International Corporation, Redwood Shores, CA (US)

(72) Inventors: Serena Wing Yee Leung, San Francisco, CA (US); Ramaswamy Sivaramakrishnan, San Jose, CA (US); Sumti Jairath, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 43 days.

(21) Appl. No.: 14/978,007

(22) Filed: Dec. 22, 2015

(65) Prior Publication Data

US 2017/0177488 A1  Jun. 22, 2017

(51) Int. Cl.
*G06F 12/12* (2016.01)
*G06F 12/0891* (2016.01)
*G06F 12/084* (2016.01)
*G06F 12/0895* (2016.01)

(52) U.S. Cl.
CPC ........ *G06F 12/0891* (2013.01); *G06F 12/084* (2013.01); *G06F 12/0895* (2013.01); *G06F 2212/62* (2013.01)

(58) Field of Classification Search
CPC .......................... G06F 12/0891; G06F 12/084
USPC ......................................................... 711/170
See application file for complete search history.

(56) References Cited

U.S. PATENT DOCUMENTS

2007/0094450 A1* 4/2007 VanderWiel .......... G06F 12/126
                                                          711/133

* cited by examiner

*Primary Examiner* — Jae Yu
(74) *Attorney, Agent, or Firm* — Osha Liang LLP (57) ABSTRACT

A method, system, and computer-readable medium for evicting cache lines that includes determining that a first cache line is to be evicted from a first Last Level Cache (LLC) partition of a partitioned LLC, and sending, based on the determination, a first notification to a second LLC partition of the partitioned LLC. The method may also include receiving, in response to the first notification, an available indication indicating that the second LLC partition is available as a designated victim cache partition; performing a selection of the second LLC partition as the designated victim cache partition; and evicting the first cache line to the second LLC partition based on the selection.

20 Claims, 5 Drawing Sheets

DYNAMIC VICTIM CACHE POLICY

BACKGROUND

In computing devices, processors often have associated cache memory. One type of cache is a Last Level Cache (LLC). LLCs are sometimes implemented as partitioned LLCs. In a partitioned LLC, each LLC partition may function as a LLC for a subset (e.g., one or more) of the processors of the computing device. At various times during operation of the computing device, one or more cache lines may be evicted from a LLC partition. Such cache line evictions are often implemented via replacing the cache line with different data (i.e., the data causing the eviction) or, if the cache line has been modified while in the cache, via writing the cache line back to an appropriate location in memory of the computing device.

SUMMARY

In general, in one aspect, the invention relates to a method for evicting cache lines. The method includes determining that a first cache line is to be evicted from a first Last Level Cache (LLC) partition of a partitioned LLC, and sending, based on the determination, a first notification to a second LLC partition of the partitioned LLC. The method may also include receiving, in response to the first notification, an available indication indicating that the second LLC partition is available as a designated victim cache partition; performing a selection of the second LLC partition as the designated victim cache partition; and evicting the first cache line to the second LLC partition based on the selection.

In general, in one aspect, the invention relates to a system for evicting cache lines. The system includes memory, processors operatively connected with the memory, a partitioned Last Level Cache (LLC), and a cache controller interfacing with the plurality of processors. In one or more embodiments of the invention, the cache controller includes functionality to determine that a first cache line is to be evicted from a first LLC partition of the plurality of LLC partitions; send, based on the determination, a first notification to a second LLC partition of the plurality of LLC partitions; receive, in response to the first notification, an available indication indicating that the second LLC partition is available as a designated victim cache partition; perform a selection of the second LLC partition as the designated victim cache partition; and evict the first cache line to the second LLC partition based on the selection.

In general, in one aspect, the invention relates to a non-transitory computer readable medium that includes instructions which, when executed by a computer processor, perform a method of evicting a cache line. The method includes determining that a first cache line is to be evicted from a first Last Level Cache (LLC) partition of a plurality of LLC partitions of a partitioned LLC and sending, based on the determination, a first notification to a second LLC partition of the plurality of LLC partitions. The method also includes receiving, in response to the first notification, an available indication indicating that the second LLC partition is available as a designated victim cache partition; performing a selection of the second LLC partition as the designated victim cache; and evicting the first cache line to the second LLC partition based on the selection.

Other aspects of the invention will be apparent from the following description and the appended claims.

DETAILED DESCRIPTION

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a system and a method for dynamically selecting, in a partitioned LLC, a designated victim cache partition in which to store one or more evicted cache lines. Specifically, in one or more embodiments of the invention, when one or more cache lines are to be evicted from a first LLC partition of the partitioned LLC, a notification is sent to each other LLC partition of the partitioned LLC. In one or more embodiments of the invention, the notification indicates that the first LLC partition has one or more cache lines to evict. In one or more embodiments of the invention, each other LLC partition makes a determination as to whether or not the LLC partition is available to serve as a designated victim cache partition by allowing one or more candidate victim cache lines to be victimized by being replaced by the evicted lines from the first LLC partition. A victim cache partition may be a LLC partition that is able, based on certain criteria, to accept and store the one or more evicted cache lines. Criteria may include, but are not limited to, whether a quantity of outstanding accesses for a given LLC partition exceeds an outstanding accesses threshold, whether one or more candidate victim cache lines have been accessed within a time-of-last-access threshold, and/or whether a candidate victim cache line has or has not been accessed more than an access frequency threshold.

In one or more embodiments of the invention, based at least in part on the aforementioned criteria, each other LLC partition sends an indication that the LLC partition is either busy (i.e., unavailable to accept evicted cache lines) or available to accept evicted cache lines from the first LLC (i.e., available as a designated victim cache partition). In one or more embodiments of the invention, based on the indications, an available victim cache register is updated to reflect the availability, or lack thereof, of each of the other LLC partitions. One of the other LLC partitions may be selected as a designated victim cache based on the status reflected in the available victim cache register and a selection protocol. In one or more embodiments of the invention, if no other LLC partition is available as a designated victim cache, the one or more cache lines to be evicted from the first cache may be written to appropriate memory location(s).

Figure 1:
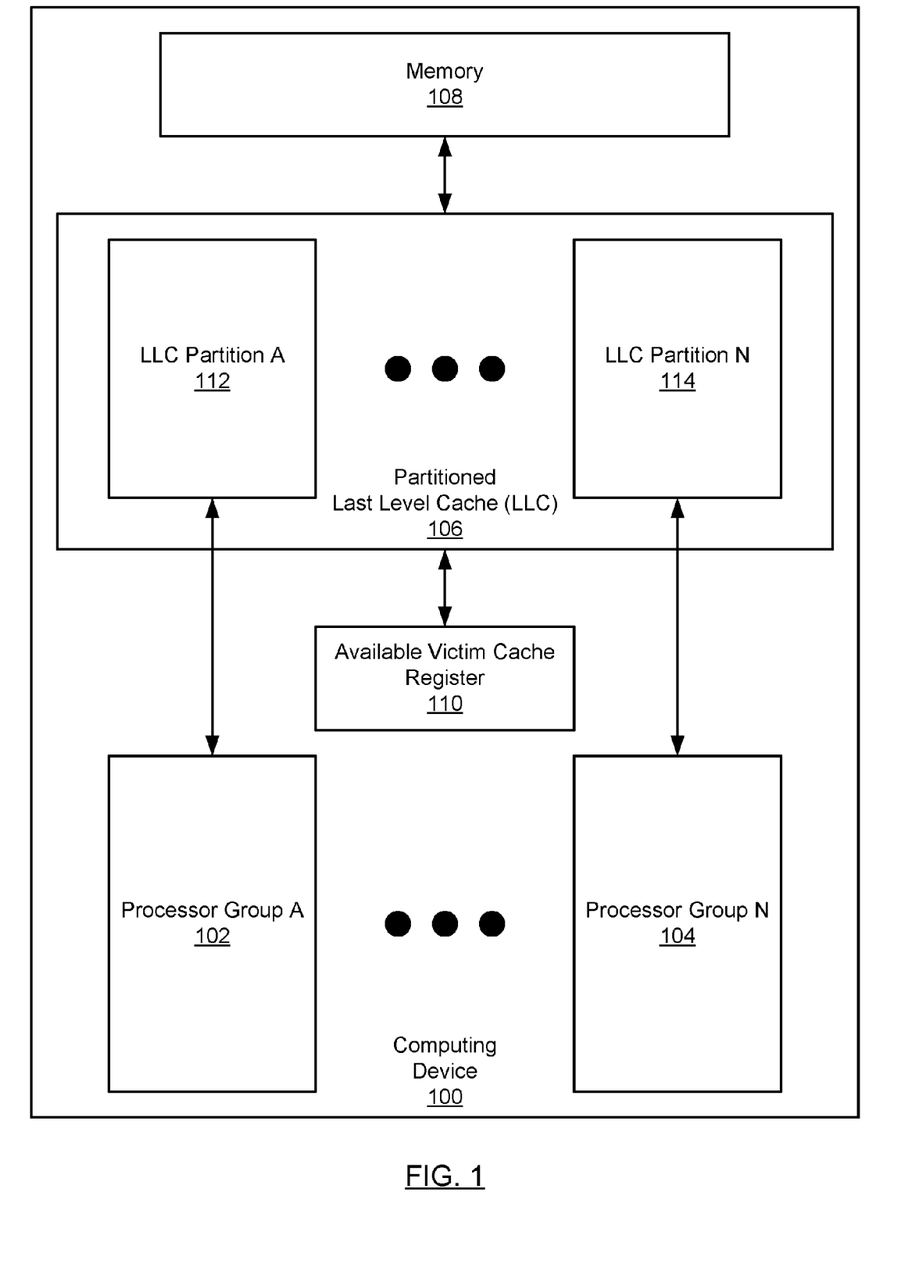
FIG. 1 shows a system in accordance with one or more embodiments of the invention.

FIG. 1 shows a system in accordance with one or more embodiments of the invention. As shown in FIG. 1, the system includes a computing device (100). In one or more embodiments of the invention, the computing device includes at least two processor groups (e.g., processor group A (102), processor group N (104)), memory (108), an available victim cache register (110), and a partitioned LLC (106). In one or more embodiments of the invention, the partitioned LLC includes at least two LLC partitions (e.g., LLC partition A (112), LLC partition N (114)). Each of these components is described below.

In one or more embodiments of the invention, a computing device (100) is any device and/or any set of devices (e.g., a distributed computing system) capable of electronically processing instructions, serially or in parallel, and that includes at least the minimum processing power, memory, cache(s), input and output device(s), operatively connected storage device(s) and/or network connectivity in order to contribute to the performance of at least some portion of the functionality described in accordance with one or more embodiments of the invention. In one or more embodiments of the invention, a computing device (100) includes a partitioned LLC (described below). Examples of computing devices include, but are not limited to, one or more server machines (e.g., a blade server in a blade server chassis), virtual machines (VMs), desktop computers, mobile devices (e.g., laptop computer, smartphone, personal digital assistant, tablet computer, and/or any other mobile computing device), any other type of computing device with the aforementioned minimum requirements, and/or any combination of the listed examples. In one or more embodiments of the invention, a computing device includes hardware, software, firmware, circuitry, integrated circuits, circuit elements implemented using a semiconducting material, registers, caches, memory controller(s), cache controller(s) and/or any combination thereof.

In one or more embodiments of the invention, the computing device (100) includes at least two processors groups (e.g., processor group A (102), processor group N (104)). As used herein, a processor group (102, 104) may refer to a single processor, or a grouping of two or more processors. A processor may refer to single-core processors or multi-core processors. In one or more embodiments of the invention, a processor is any hardware capable of, at least in part, executing sequences of instructions (e.g., the instructions of a computer program) in a computing device. In one or more embodiments of the invention, a processor is a collection of electronic circuitry capable of implementing various actions (e.g., arithmetic, Boolean logic, move data, etc.) in order to carry out instructions (e.g., write to a variable, read a value, etc.). For example, a processor may be a microprocessor fabricated, at least in part using a semiconducting material, as one or more integrated circuits.

In one or more embodiments of the invention, the computing device (100) includes memory (e.g., memory A (108)). In one or more embodiments of the invention, memory (108) is a physical medium for storing information for use by one or more processor groups (102, 104) and/or any other component of a computing device. Memory (108) may include functionality to store information for any amount of time. For example, memory such as Random Access Memory (RAM) may store information until power is removed from the system. As another example, memory may refer to more permanent storage of the computing device (e.g., hard disk drives, solid state drives, etc.) used, in part, to implement a memory paging scheme. In one or more embodiments of the invention, the memory (108) of a computing device is operatively connected to one or more processors (e.g., processors of processor group A (102) and/or processor group N (104)) of the computing device (100). For example, memory (108) may be connected to a processor via, at least in part, one or more caches (described below). In one or more embodiments of the invention, although not shown in FIG. 1, memory (108) may include and/or be operatively connected to one or more memory controllers. In one or more embodiments of the invention, memory (108) may be any amount of memory arranged in any manner and operatively connected to any other components of the computing device (e.g., the partitioned LLC (106)) in any manner. For example, memory may be several memory modules, each operatively connected to one or more processors and/or processor groups (102, 104).

In one or more embodiments of the invention, the memory (108) is operatively connected to a partitioned LLC (106). In one or more embodiments of the invention, a partitioned LLC is cache memory (i.e., a cache). In one or more embodiments of the invention, a cache is a type of memory that temporarily stores data that may be used again by a processor group (102, 104). In one or more embodiments of the invention, a cache generally includes functionality to reduce the average time for a processor of a processor group (102, 104) to access data by storing data that has been previously used by the processor group. As an example, a cache may operate faster than other computing device memory and/or be physically located closer to a processor than other computing device memory. In one or more embodiments of the invention, a processor of a processor group (102, 104) may check a cache for data that a thread executing on the processor seeks to access (e.g., to perform a read, to perform a write, etc.). If the cache includes the requested data, the data may be provided to the processor (i.e., a cache hit occurs). If the cache does not include the requested data (i.e., a cache miss), then the cache may retrieve the data from memory (108) or from another cache (not shown). In one or more embodiments of the invention, if a processor modifies data stored in a cache (e.g., creating a "dirty" cache line), then, using any cache line eviction policy (e.g., a write-back policy), the data may be written back to memory, another cache, and/or another cache partition sometime later, and other caches may be notified so that any copies of the data in those caches may be invalidated.

In one or more embodiments of the invention, a partitioned LLC (106) is a cache that is farthest from one or more operatively connected processor groups (102, 104) in a cache hierarchy with any number of cache hierarchy levels. For example, a given processor may include and/or be operatively connected to a level one (L1) cache, a level two (L2) cache, and a LLC. In such an example, each cache has lower access latency than accessing data from memory, with the L1 cache having the lowest access latency, followed by the L2 cache, and then the LLC with the highest latency among the caches. In one or more embodiments of the invention, the partitioned LLC (106) is the only cache.

A partitioned LLC (106) may be implemented on the same chip as a processor and/or may be implemented as separate hardware operatively connected to one or more processor groups (102, 104). In one or more embodiments of the invention, a partitioned LLC (106) is also operatively connected to at least a portion of the memory (108) of a computing device (100). In one or more embodiments of the invention, the partitioned LLC (106) is a cache that is shared by two or more processor groups (102, 104) of a computing device (100), and, as such, may be referred to as a shared LLC.

In one or more embodiments of the invention, a partitioned LLC (106) is a shared LLC that is divided into two or more partitions (e.g., LLC partition A (112), LLC partition B (114)), each including functionality to act as a LLC for one or more processor groups (102, 104) of the computing device (100). For example, in embodiments of the invention in which a processor group refers to one processor, if a computing device has sixteen processors, a partitioned LLC may be partitioned into sixteen partitions, each serving as a LLC for one of the processor groups. As another example, in embodiments of the invention in which processor groups include four processors, if a computing device has sixteen processors, a partitioned LLC may be partitioned into four partitions, with each partition serving as a LLC for four of the processors (i.e., one of the processor groups). A LLC partition (112, 114) may include any portion of a partitioned LLC (106) and any number of cache lines (not shown) corresponding to any amount of memory (108).

In one or more embodiments of the invention, although not shown in FIG. 1, the partitioned LLC (106) may include and/or be operatively connected to one or more cache controllers (e.g., a partitioned LLC controller). In one or more embodiments of the invention, a cache controller includes hardware, software, firmware, circuitry, integrated circuits, and/or any combination thereof. A cache controller may be part of the cache hardware, the processor hardware, or part of any other component of a computing device (100). A cache controller may be implemented as separate hardware and/or software operatively connected to any component of a computing device (e.g., processors, caches, memory, etc.) alone or in combination. In one or more embodiments of the invention, a cache controller refers to one cache controller or to two or more cache controllers. In one or more embodiments of the invention, a cache controller may include functionality to perform, at least in part, cache management operations on behalf of any number of caches (e.g., partitioned LLC (106)) and/or cache partitions (e.g., LLC partition A (112), LLC partition N (114)). As an example, cache management operations that a cache controller may perform include, but are not limited to, obtaining data (e.g., from memory, from other caches, from other LLC partitions, etc.), storing data in a cache, implementing one or more cache line eviction policies, implementing one or more write-back policies, maintaining data related to the use of the cache and any cache lines therein, determining if data is present in cache, and/or any other operation relevant to the management of a cache.

In one or more embodiments of the invention, the computing device (100) includes an available victim cache register (110). In one or more embodiments of the invention, a register is a component of a computing device that is used for storing small amounts of data that may be accessed quickly (e.g., compared to accessing data from memory). A register may be used to indicate the status of one or more items of interest within a computing device (100). In one or more embodiments of the invention, a register is a hardware register. A hardware register may be implemented as a part of any other component (e.g., a processor, a cache, etc.) of a computing device and/or may be implemented as separate hardware operatively connected to any one or more components of a computing device (e.g., a partitioned LLC controller). In one or more embodiments of the invention, the available victim cache register (110) may be implemented by any software executing on the computing device, and, as such, may exist as a portion of any memory or cache of the computing device.

In one or more embodiments of the invention, an available victim cache register (110) is a register that includes any number of portions (e.g., one or more bits, bytes, etc.) for indicating the status (i.e., available or busy) of any number of LLC partitions (112, 114) regarding whether they are available to serve as a designated victim cache partition. For example, in a computing device with a partitioned LLC that is partitioned into eight partitions, an available victim cache register may include eight bits, with each bit used to indicate the availability, or lack thereof, of one of the LLC partitions to serve as a designated victim cache partition.

While FIG. 1 shows a configuration of components, other configurations may be used without departing from the scope of the invention. For example, various components may be combined to create a single component. As another example, the functionality performed by a single component may be performed by two or more components. Additionally, as mentioned above, a processor group may refer to only one processor or to two or more processors, and a computing device may include any number of processors. Furthermore, a computing device may have any number of caches and any amount of memory. Moreover, processors, caches, and/or memory may be operatively connected in any number of ways. Accordingly, embodiments of the invention should not be considered limited to the specific arrangements of modules and elements shown in FIG. 1.

Figure 2:
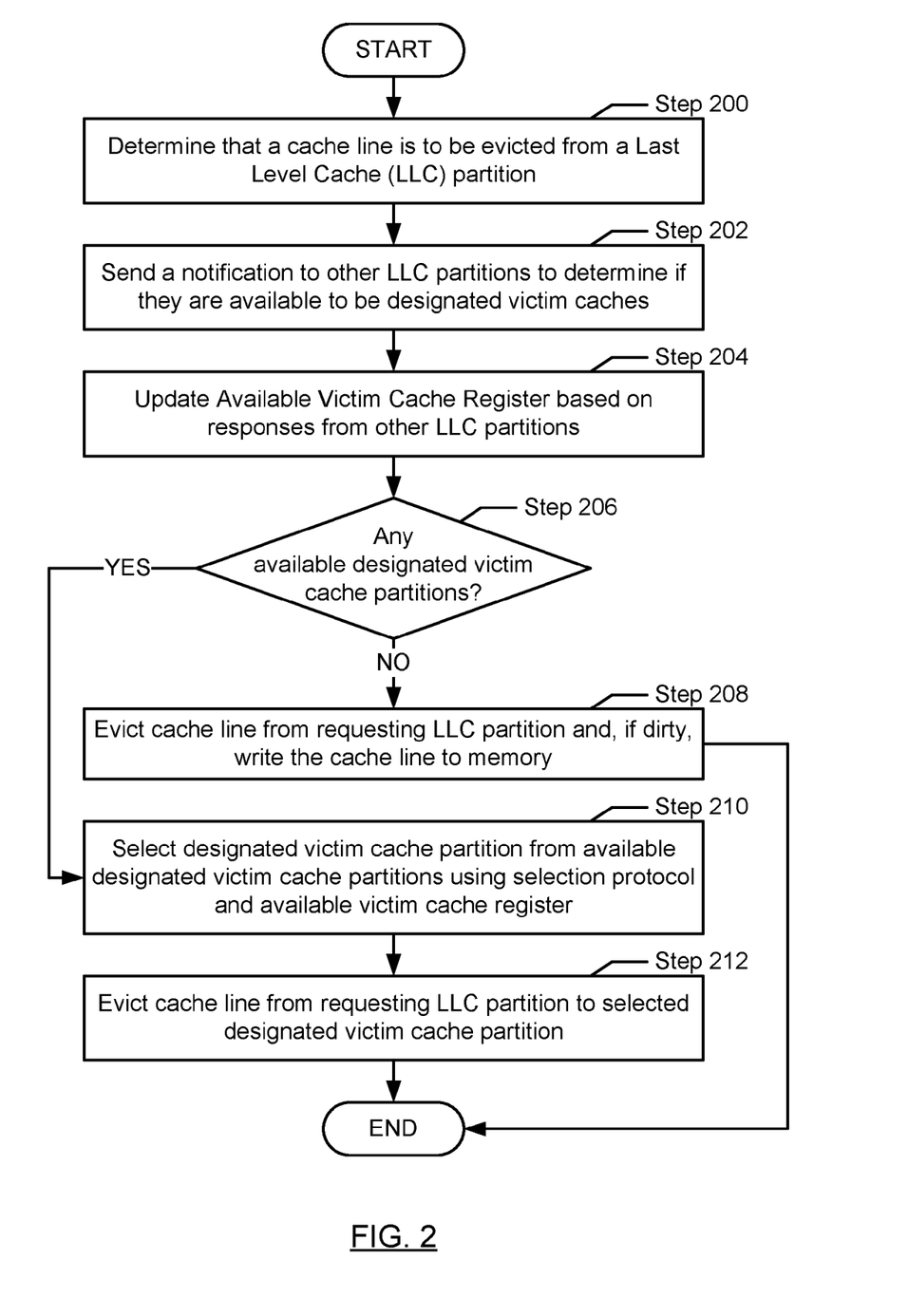
FIG. 2 shows a flowchart in accordance with one or more embodiments of the invention.
Figure 3:
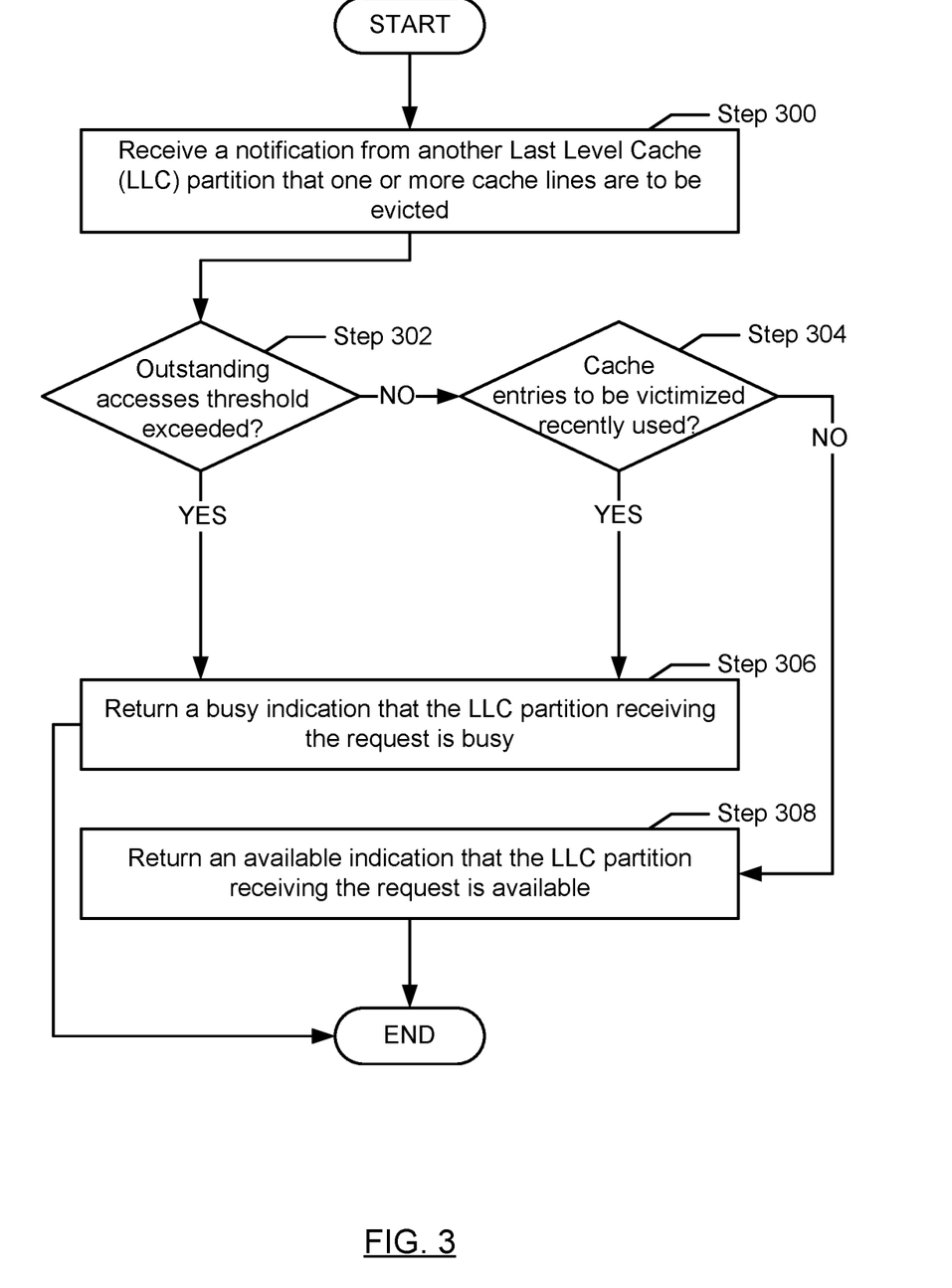
FIG. 3 shows a flowchart in accordance with one or more embodiments of the invention.

FIGS. 2 and 3 show flowcharts in accordance with one or more embodiments of the invention. While the various steps in these flowcharts are presented and described sequentially, one having ordinary skill in the art and the benefit of this description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for selecting a designated victim cache partition and evicting one or more cache lines from a LLC partition in accordance with one or more embodiments of the invention.

In Step 200, a determination is made that one or more cache lines are to be evicted from a LLC partition. In one or more embodiments of the invention, a cache line may be evicted for any reason. For example, a processor operatively connected to the LLC partition may be executing a series of instructions as a part of a thread that is performing the functionality of at least a portion of a computer program executing on a computing device. In such an example, the processor may need to access data that is not located on the LLC partition (i.e., a cache miss occurs). The data may then need to be retrieved from another location, such as, memory or another LLC partition. In one or more embodiments of the invention, in order for the new data to be available to the processor, the data is moved to the LLC partition, necessitating replacement of one or more cache lines of the LLC partition. Such replacement leads to eviction of the one or more cache lines to be replaced.

In Step 202, once a determination is made that one or more cache lines are to be evicted from the LLC partition, a notification is sent to each other LLC partition if they are currently available as designated victim caches. In one or more embodiments of the invention, the LLC partition sending the notification includes functionality to send the notification, and the other LLC partitions include functionality to receive such notifications. In other embodiments of the invention, one or more cache controllers operatively connected to the various LLC partitions may include functionality to send and/or receive the notification. For example, each LLC partition may include and/or be operatively connected to a separate cache controller that includes functionality to send and/or receive cache line eviction notifications. As another example, a partitioned LLC may include and/or be operatively connected to a cache controller that functions as a cache controller for each of the LLC partitions of the partitioned LLC. In such an example, the single cache controller may include functionality to determine that one or more cache lines are to be evicted from a LLC partition, and the notification is sent to the portion of the cache controller responsible for monitoring, managing, etc., each of the other LLC partitions.

In Step 204, an available victim cache register is updated based on the responses corresponding to each of the other LLC partitions. In one or more embodiments of the invention, each other LLC partition, in response to the notification sent in Step 202, returns an indication (e.g., via one or more cache controllers) as to whether the LLC partition is either available as a designated victim cache partition, or busy (i.e., the LLC partition is not available as a designated victim cache partition).

One having ordinary skill in the art and the benefit of this Detailed Disclosure will appreciate that, in one or more embodiments of the invention, an LLC partition that returns an indication of availability may not allow modification of the one or more cache lines of the LLC partition that are available as victim cache lines. For example, the one or more potential victim cache lines of the LLC partition may be locked such that new or modified data may not be placed in the one or more cache lines until after the a designated victim cache register has been selected, or until after the eviction of Step 202 takes place. As another example, the potential victim cache lines may be marked as invalid, and access to the one or more cache lines by lower level caches (i.e., caches closer to one or more processor groups than to memory in a cache hierarchy) and/or memory may be restricted. In one or more embodiments of the invention, the process of sending notifications, receiving indications from LLC partitions, and evicting cache lines to a designated victim cache register may be an atomic operation. The process by which a determination is made as to whether a given LLC partition is available or busy is discussed further in the description of FIG. 3 below.

In one or more embodiments of the invention, updating the available victim cache register includes modifying, if necessary, the contents of one or more portions of an available victim cache register corresponding to each of the LLC partitions that returned an available or busy reply. In one or more embodiments of the invention, if the status of a given LLC partition has not changed since the last time the status was checked, the available victim cache register partition for that LLC partition may or may not be updated.

In one or more embodiments of the invention, the available victim cache register includes an separate available victim cache register portion corresponding to each LLC partition of a partitioned LLC. For example, the available victim cache register may be a bit register with one bit representing each of the LLC partitions of a partitioned LLC. In such an example, updating the available victim cache register in response to the indications includes performing a write, if necessary, to each bit corresponding to a LLC partition for which an indication was received. Continuing the example, a bit may be set to either one or zero, with one indicating that the LLC partition to which the bit corresponds is available as a designated victim cache, and zero indicating that the LLC partition to which the bit corresponds is busy.

In Step 206, a determination is made as to whether there are any available designated victim cache partitions. In one or more embodiments of the invention, the determination is made by checking the available victim cache register. For example, in a computing device with a partitioned LLC having eight LLC partitions, the bits corresponding to the seven LLC partitions other than the LLC partition seeking to evict one or more cache lines may be checked to determine if any are set to one, indicating that an LLC partition is available as a designated victim cache partition.

In one or more embodiments of the invention, the determination as to whether there are any available victim cache partitions is not made until each LLC partition has returned a response to the notification sent in Step 202. Additionally or alternatively, the determination may be made after a period of time has passed, after a certain portion of the LLC partitions return a response, or any other method of waiting to receive responses from LLC partitions before making the determination of Step 206. In one or more embodiments of the invention, if there are any available designated victim cache partitions, the process proceeds to Step 210. However, if a determination is made that there are no available designated victim cache partitions, the process proceeds to Step 208.

In Step 208, the one or more cache lines are evicted from the LLC partition without being stored in another LLC partition. In one or more embodiments of the invention, if the contents of the one or more cache lines have not been modified while in the LLC partition, then the eviction may include replacing the one or more cache lines to be evicted with the data being moved into the cache that caused the eviction. In one or more embodiments of the invention, if the one or more cache lines have been modified in any way (e.g., written to) while in the LLC partition (e.g., if the cache line is dirty), the eviction may include writing the one or more cache lines back to appropriate locations in memory.

In Step 210, after determining in Step 206 that one or more of the other LLC partitions are available as designated victim cache partitions, a designated victim cache partition is selected. In one or more embodiments of the invention, if there is only one LLC partition available as a designated victim cache partition, then that LLC partition is selected as the designated victim cache partition. In one or more embodiments of the invention, if there are two or more of the other LLC partitions that have a corresponding available victim cache register portion that indicates that the LLC partition is available as a designated victim cache partition, then the selection is made using a selection protocol. In one or more embodiments of the invention, the selection protocol may be any method of selecting one designated victim cache partition out of a group of more than one. Possible selection protocols may include, but are not limited to, a round robin selection protocol, a ranking selection protocol, a least frequently used selection protocol, a sequential selection protocol, a random selection protocol, an odd-even alternating selection protocol, a lowest bit number selection protocol, etc. In one or more embodiments of the invention, the check of the available victim cache register and/or the use of the selection protocol may be performed by one or more cache controllers.

In Step 212, the one or more cache lines are evicted from the LLC partition seeking to evict to the designated victim cache partition selected in Step 210. In one or more embodiments of the invention, evicting the one or more cache lines to the designated victim cache partition includes evicting an equivalent number of cache lines (i.e., candidate victim cache lines) from the designated victim cache partition. If the one or more candidate victim cache lines include data that was modified while in the cache, then the one or more candidate victim cache lines may be written back to an appropriate memory location before being replaced by the cache lines evicted from the LLC partition initially seeking to evict one or more cache lines. If the one or more candidate victim cache lines include no data modified while in the cache, then the one or more candidate victim cache lines may be replaced by the one or more cache lines from the LLC partition initially seeking to evict the one or more cache lines. In one or more embodiments of the invention, the process of evicting cache lines from a LLC partition to a designated victim cache partition is not a recursive process. Said another way, the one or more cache lines that are evicted from a designated victim cache may be replaced or written back to memory, but may not, in turn, be evicted to another victim LLC partition.

One having ordinary skill in the art and the benefit of this Detailed Description will recognize that having the evicted one or more cache lines stored in another LLC partition of the partitioned LLC rather than memory may allow for the data to be accessed in the future with lower latency than accessing the data from the evicted one or more cache lines after being written back to memory. For example, when any processor of any processor group seeks to access the data, and the data is not in the LLC partition corresponding to that processor group, then the remaining LLC partitions of the partitioned LLC may be checked for the data before the data is retrieved from memory. In such an example, obtaining the data from another LLC partition of the same partitioned LLC has lower latency than obtaining the data from memory, because the other LLC partitions are fabricated as a part of the same LLC device as the LLC partition requesting the data.

FIG. 3 shows a flowchart of a method for determining if a given LLC partition is available as a designated victim cache partition in accordance with one or more embodiments of the invention.

In Step 300, a notification (i.e., one of the notifications sent in Step 202 of FIG. 2) is received by a LLC partition. In one or more embodiments of the invention, the notification is received by the LLC partition. In other embodiments of the invention, the notification is received by a cache controller included in and/or operatively connected to the LLC partition. The notification may include information other than that another LLC partition seeks to evict one or more cache lines without departing from the scope of the invention. For example, the notification may include the number of cache lines to be evicted. As another example, the notification may include the age of the cache lines to be evicted.

In Step 302, a determination is made as to whether an outstanding accesses threshold is currently exceeded. In one or more embodiments of the invention, an outstanding access is a not-yet-serviced request to access data in an LLC partition that may, for example, be stored in an outstanding access request buffer operatively connected to an LLC partition and/or a cache controller of the LLC partition. In one or more embodiments of the invention, an outstanding accesses threshold is a quantity of outstanding access requests above which an LLC partition is busy and unable to serve as a designated victim cache.

In one or more embodiments of the invention, the outstanding accesses threshold is a preset threshold. In one or more embodiments of the invention, the outstanding accesses threshold may be configured by any entity using or executing on a computing device. For example, the outstanding accesses threshold may be programmable by a user of the computing device. As another example, software executing on the computing device may include functionality to set the outstanding accesses threshold based on any criteria (e.g., operating conditions of the computing device, workloads of the computing device, etc.). In either example, the determination may be made, for example, by checking the number of entries in an outstanding access request buffer. In one or more embodiments of the invention, if a determination is made that the outstanding accesses threshold is currently exceeded, then the process proceeds to Step 306. In one or more embodiments of the invention, if a determination is made that the outstanding accesses threshold is not currently exceeded, then the process proceeds to Step 304.

In Step 304, a determination is made as to whether one or more candidate victim cache lines have been used recently. In one or more embodiments of the invention, whether a candidate victim cache line has been used recently may be referred to as a time-of-last-access threshold. In one or more embodiments of the invention, the LLC partition, an operatively connected cache controller, or any other entity or component of a computing device includes functionality to track the time at which a given cache line was last accessed by an operatively connected processor. In one or more embodiments of the invention, determining whether a time-of-last-access threshold has been exceeded includes checking the information maintained for one or more cache lines of the LLC partition and comparing with the time-of-last-access threshold value. In one or more embodiments of the invention, the time-of-last-access threshold represents a time (e.g., milliseconds, seconds, minutes, etc.).

In one or more embodiments of the invention, the time-of-last-access threshold is a preset threshold. In one or more embodiments of the invention, the time-of-last-access threshold may be configured by any entity using or executing on a computing device. For example, the time-of-last-access threshold may be programmable by a user of the computing device. As another example, software executing on the computing device may include functionality to set the time-of-last-access threshold based on any criteria (e.g., operating conditions of the computing device, workloads of the computing device, etc.). In one or more embodiments of the invention, for the LLC partition to be available, the time-of-last-access threshold must be exceeded for as many cache lines as the notification received in Step 300 indicated that the evicting LLC partition seeks to evict. In one or more embodiments of the invention, if enough cache lines have exceeded the time-of-last-access threshold, then the LLC partition is available as a designated victim cache and the process proceeds to Step 308. In one or more embodiments of the invention, if enough cache lines have not exceeded the time-of-last-access threshold, then the LLC partition is not available as a designated victim cache and the process proceeds to Step 306.

One having ordinary skill in the art and having the benefit of this Detailed Description will recognize that the threshold of Step 302, the threshold of Step 304, or any other relevant threshold may be used, individually or in any combination, to determine whether a LLC partition is available as a designated victim cache partition without departing from the scope of the invention.

For example, in addition to the threshold of Step 302 and the threshold of Step 304, an access frequency threshold may also be used to determine whether an LLC partition is available as a designated victim cache partition. In one or more embodiments of the invention, an access frequency threshold corresponds to a number of cache line accesses per a unit of time. For example, an access frequency threshold may be ten accesses per minute over the previous five minutes. In one or more embodiments of the invention, if the access frequency threshold is exceeded, then the LLC partition is not available as a designated victim cache partition. In one or more embodiments of the invention, if the access frequency threshold has not been exceeded, then the LLC partition is available as a designated victim cache partition. In one or more embodiments of the invention, the access frequency threshold is checked for at least as many cache line as the evicting LLC partition seeks to evict.

As another example, a comparison of relative age may be made between the one or more cache lines to be evicted and the one or more potential victim cache lines of the victim LLC partition. In such an example, if the cache lines to be evicted are older, then the potential victim LLC partition may return a busy indication. In one or more embodiments of the invention, any relevant threshold used may be a preset threshold and/or may be configurable by any entity using or executing on a computing device.

Turning to Step 306, if the outstanding access threshold is currently exceeded (determined in Step 302), a quantity of cache lines of the LLC partition equal to or greater than the number of cache lines the evicting LLC seeks to evict have not exceeded a time-of last access threshold (determined in Step 304), and/or any other relevant threshold condition (e.g., access frequency threshold) has not been satisfied, then an indication is returned that the LLC partition is busy and unavailable as a designated victim cache partition. In one or more embodiments of the invention, the LLC partition includes functionality to make the relevant threshold determinations and send the busy indication. In other embodiments of the invention, a cache controller operatively connected to the LLC partition includes functionality to make the relevant determinations and send the busy indication. In one or more embodiments of the invention, after the busy indication is sent, the process ends.

In Step 308, if the outstanding access threshold is not currently exceeded (determined in Step 302), a quantity of cache lines of the LLC partition equal to or greater than the number of cache lines the evicting LLC seeks to evict have exceeded a time-of-last-access threshold (determined in Step 304), and/or any other relevant threshold condition (e.g., access frequency threshold) has been satisfied, then an indication is returned that the LLC partition is available as a designated victim cache partition. In one or more embodiments of the invention, the LLC partition includes function-ality to make the relevant threshold determinations and send the available indication. In other embodiments of the invention, a cache controller operatively connected to the LLC partition includes functionality to make the relevant determinations and send the available indication. In one or more embodiments of the invention, after the available indication is sent, the process ends.

Figure 4:
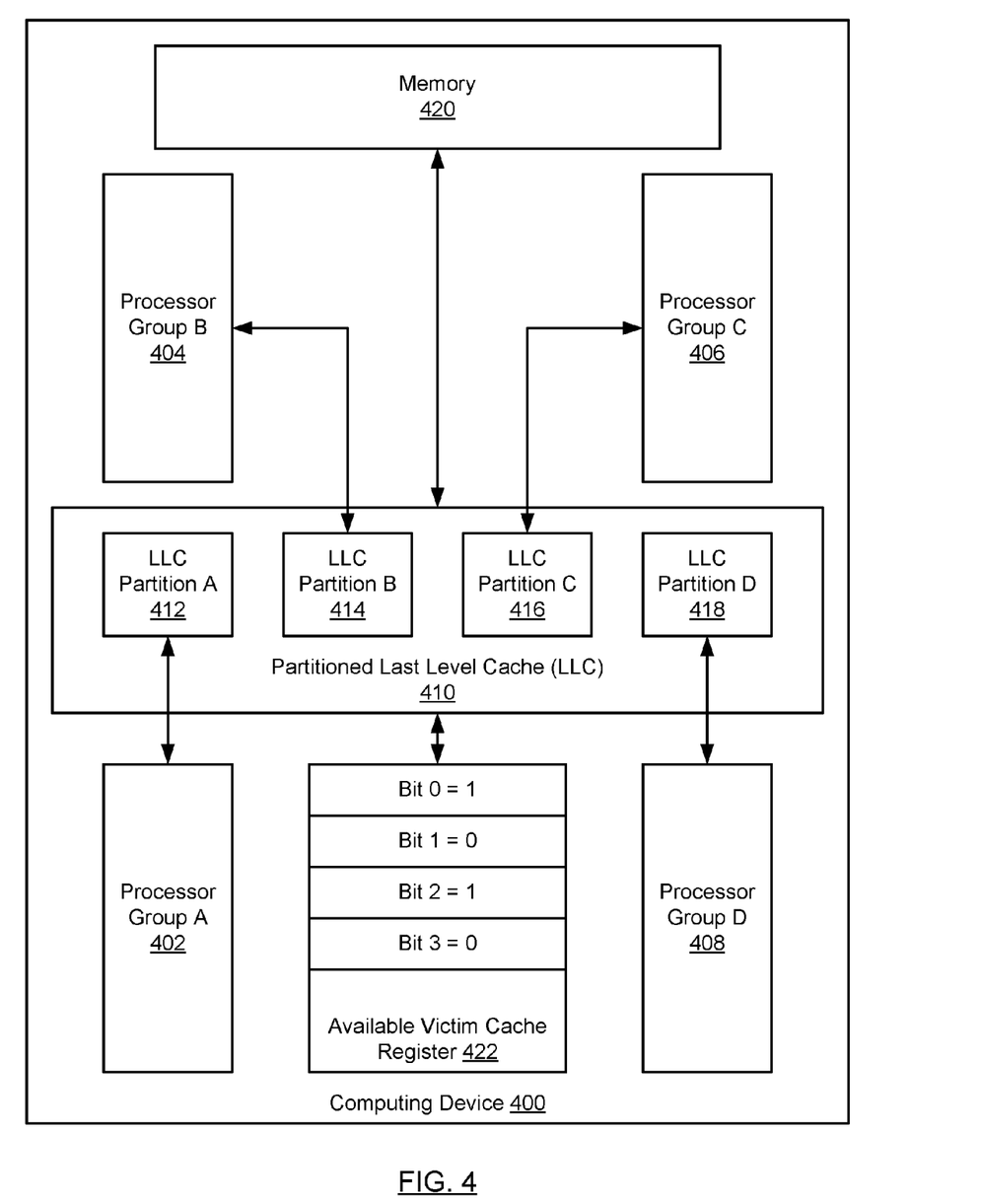
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a computing device (400) includes processor group A (402), processor group B (404), processor group C (406), processor group D (408), memory (420), an available victim cache register (422), and a partitioned LLC (410). The partitioned LLC is a shared LLC (i.e., shared by the processor groups) and includes LLC partition A (412), LLC partition B (414), LLC partition C (416), and LLC partition D (418). In the present example, each processor group includes two processors (not shown). LLC partition A (412) is operatively connected to and functions as a LLC for processor group A (402). LLC partition B (414) is operatively connected to and functions as a LLC for processor group B (404). LLC partition C (416) is operatively connected to and functions as a LLC for processor group C (406). LLC partition D (418) is operatively connected to and functions as a LLC for processor group D (408). The partitioned LLC is operatively connected to the memory (420) and the available victim cache register. Each LLC partition includes a cache controller (not shown). The available victim cache register (422) is a four bit register. Bit 0 of the available victim cache register corresponds to LLC partition A. Bit 1 of the available victim cache register corresponds to LLC partition B. Bit 2 of the available victim cache register corresponds to LLC partition C. Bit 3 of the available victim cache register corresponds to LLC partition D.

In such a scenario thread (not shown) executing on a processor of processor group B (404) seeks to use data that is not currently stored in LLC partition B (414). Accordingly, the data must be retrieved from another source. In the present example, the data that the thread seeks to use is small enough to store on a single cache line. The other partitions of the LLC are first checked to determine if the requested data is stored in any of the other LLC partitions. However, it is determined that the data is not currently stored in a cache line of LLC partition A (412), LLC partition C (416), or LLC partition D (418). Accordingly, the data must be obtained from memory (420). In order to make room for the data obtained from memory, LLC partition B (414) must first evict a cache line.

In order to evict a cache line, a cache controller (not shown) operatively connected to LLC partition B (414) first sends a notification to cache controllers operatively connected to LLC partition A (412), LLC partition C (416), and LLC partition D (418). Then, the cache controller operatively connected to each of those LLC partitions first makes a determination as to whether an outstanding accesses threshold is currently exceeded for the LLC partition. The cache controllers operatively connected to LLC partition A (412) and LLC partition C (416) determine that their respective outstanding accesses threshold has not been exceeded. However, the cache controller operatively connected to LLC partition D (418) determines that the outstanding accesses threshold set for LLC partition D has been exceeded. Accordingly, the cache controller operatively connected to LLC partition D (418) sends a busy indication, and a zero is written to Bit 3 of the available victim cache register (422), which, as mentioned above, corresponds to LLC partition D (418). The zero written to Bit 3 of the available victim cache register indicates that LLC partition D is not available as a designated victim cache partition. Next, the cache controllers operatively connected to LLC partition A (412) and LLC partition C (416) make a determination that the respective time-of-last-access thresholds have been exceeded for at least one cache line in each of LLC partition A and LLC partition C. Finally, the cache controllers for LLC partition A (412) and LLC partition C (416) determine that the respective access frequency thresholds for LLC partition A and LLC partition C have not been exceeded. Because the criteria for each of the three thresholds are currently satisfied for LLC partition A (412) and for LLC partition C (416), the cache controllers for LLC partition A and LLC partition C send available indications and a one is written to Bit 0 (corresponding to LLC partition A) and Bit 2 (corresponding to LLC partition C) of the available victim cache register (422). The one indicates that both LLC partition A (412) and LLC partition C (416) are available as designated victim cache registers.

Next, in order to evict the cache line, the cache controller operatively connected to LLC partition B (414) checks the available victim cache register (422) and determines that there are two available designated victim cache registers (i.e., LLC partition A and LLC partition C). In the present example, a lowest bit number selection protocol is implemented. Accordingly, LLC partition A is selected as the designated victim cache, as Bit 0 is a lower bit number than Bit 2. Once LLC partition A (412) is selected as the designated victim cache partition, a candidate victim cache line in LLC partition A is determined not to be a dirty cache line. Therefore, the candidate cache line of LLC partition A is simply replaced by the cache line evicted from LLC partition B.

Sometime later, a processor of processor group B (404) seeks to access data in the cache line previously evicted from LLC partition B. Before attempting to retrieve the data from memory, LLC partition A (412), LLC partition C (416), and LLC partition D (418) are each checked to determine if they include the relevant cache line. In the present example, because the cache line was evicted to LLC partition A (412), the data is retrieved from LLC partition A with lower latency than retrieving the data of the cache line from memory (420).

Figure 5:
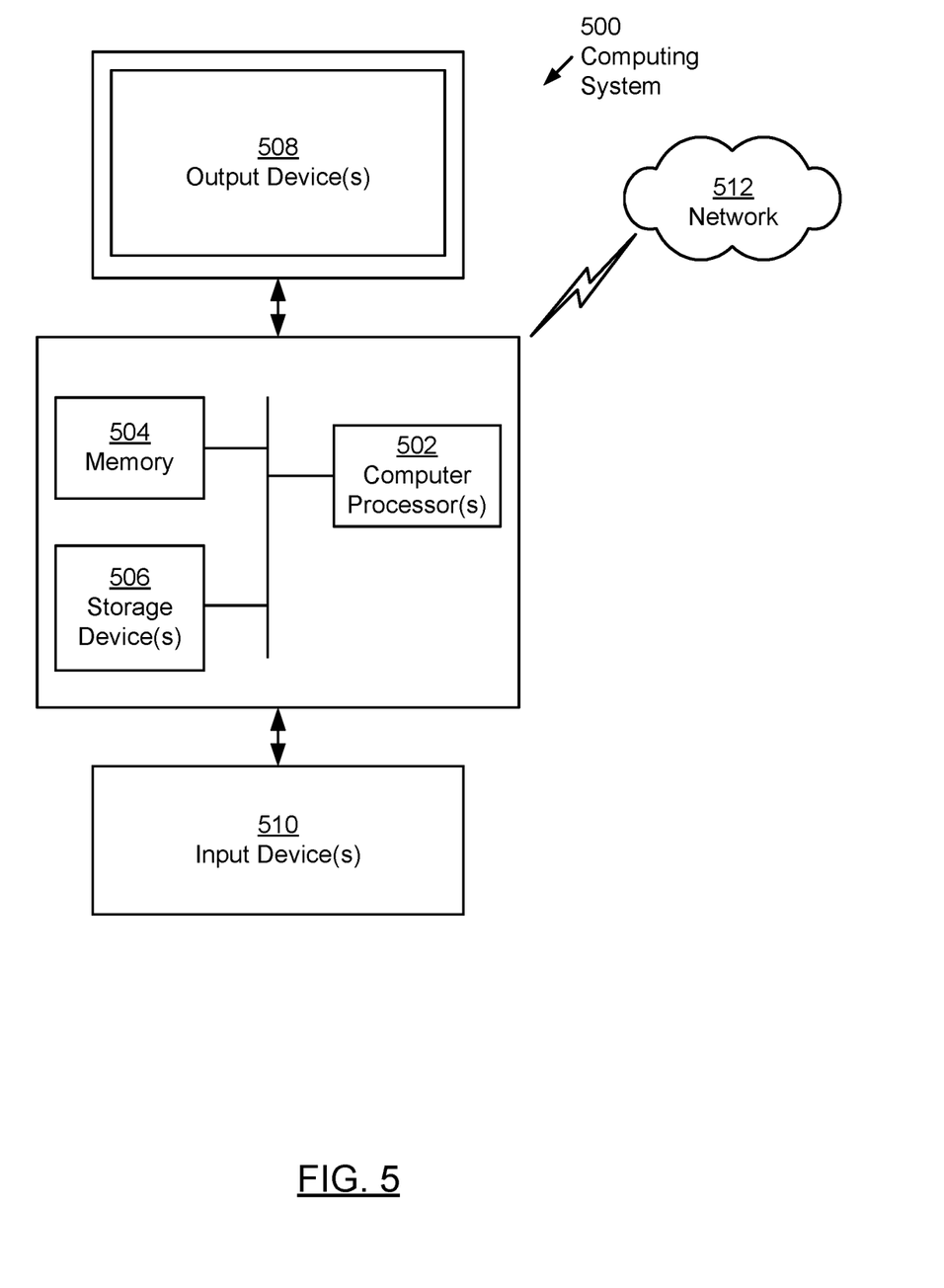
FIG. 5 shows a computing system in accordance with one or more embodiments of the invention.

Embodiments of the invention may be implemented on a computing system (i.e., a computing device). Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores, of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evicting cache lines, the method comprising:
   determining that a first cache line is to be evicted from a first Last Level Cache (LLC) partition of a plurality of LLC partitions of a partitioned LLC;
   sending, based on the determination, a first notification to a second LLC partition of the plurality of LLC partitions;
   receiving, in response to the first notification, an available indication indicating that the second LLC partition is available as a designated victim cache partition,
   wherein the second LLC partition sends the available indication based on making a first determination that a value describing the availability of the second LLC partition is within a threshold;
   performing a selection of the second LLC partition as the designated victim cache partition; and
   evicting the first cache line to the second LLC partition based on the selection.

2. The method of claim 1, wherein the first determination comprises:
   making, after receiving the first notification, a second determination that an outstanding accesses threshold has not been exceeded; and
   making a third determination that a candidate victim cache line has not been accessed within a time-of-last-access threshold.

3. The method of claim 2, wherein the first determination further comprises making a fourth determination that the candidate victim cache line has not been accessed more than an access frequency threshold.

4. The method of claim 3, wherein the outstanding access threshold, the time-of-last-access threshold, and the access frequency threshold are each programmable.

5. The method of claim 1, further comprising:
updating, based on the available indication and before the selection, an available victim cache register portion of an available victim cache register to indicate that the second LLC partition is available as the designated victim cache partition, wherein the available victim cache register portion corresponds to the second LLC partition.

6. The method of claim 5, further comprising:
sending, before the selection, the first notification to other LLC partitions of the plurality of LLC partitions;
receiving, from the other LLC partitions and in response to sending the first notification to the other LLC partitions, a plurality of indications comprising a plurality of available indications and a plurality of busy indications, wherein each of the plurality of available indications indicate that one of the other LLC partitions is available as the designated victim cache partition and each of the plurality of busy indications indicate that one of the other LLC partitions is not available as the designated victim cache partition; and
updating, before the selection and based on the plurality of indications, a plurality of other available victim cache register portions of the available victim cache register,
wherein the selection is performed using a selection protocol and the available victim cache register.

7. The method of claim 6, wherein the selection protocol is a round robin selection protocol.

8. The method of claim 1, further comprising:
determining, after evicting the first cache line, that a second cache line is to be evicted from the first LLC partition;
sending, based on the determination, a second notification to each of the plurality of LLC partitions;
receiving, in response to the second notification, one busy indication from each of the plurality of LLC partitions;
updating each available victim cache register portion of an available victim cache register to indicate that each of the plurality of LLC partitions are busy; and
evicting the second cache line to memory.

9. A system for evicting cache lines, the system comprising:
memory;
a plurality of processors interfacing with memory;
a partitioned Last Level Cache (LLC) comprising a plurality of LLC partitions; and
a cache controller interfacing with the plurality of processor and configured to:
determine that a first cache line is to be evicted from a first LLC partition of the plurality of LLC partitions;
send, based on the determination, a first notification to a second LLC partition of the plurality of LLC partitions;
receive, in response to the first notification, an available indication indicating that the second LLC partition is available as a designated victim cache partition, wherein the second LLC partition sends the available indication based on making the first determination that a value describing the availability of the second LLC partition is within a threshold;
perform a selection of the second LLC partition as the designated victim cache partition; and
evict the first cache line to the second LLC partition based on the selection.

10. The system of claim 9, wherein the first determination comprises:
making, after receiving the first notification, a second determination that an outstanding accesses threshold has not been exceeded; and
making a third determination that a candidate victim cache line has not been accessed within a time-of-last-access threshold.

11. The system of claim 10, wherein the first determination further comprises making a fourth determination that the candidate victim cache line has not been accessed more than an access frequency threshold.

12. The system of claim 11, wherein the outstanding accesses threshold, the time-of-last-access threshold, and the access frequency threshold are each programmable.

13. The system of claim 9, wherein the cache controller is further configured to:
update, based on the available indication and before the selection, an available victim cache register portion of an available victim cache register to indicate that the second LLC partition is available as the designated victim cache partition, wherein the available victim cache register portion corresponds to the second LLC partition.

14. The system of claim 13, wherein the cache controller is further configured to:
send, before the selection, the first notification to other LLC partitions of the plurality of LLC partitions;
receive, from the other LLC partitions and in response to sending the first notification to the other LLC partitions, a plurality of indications comprising a plurality of available indications and a plurality of busy indications, wherein each of the plurality of available indications indicate that one of the other LLC partitions is available as the designated victim cache partition and each of the plurality of busy indications indicate that one of the other LLC partitions is not available as the designated victim cache partition; and
update, before the selection and based on the plurality of indications, a plurality of other available victim cache register portions of the available victim cache register,
wherein the selection is performed using a selection protocol and the available victim cache register.

15. The system of claim 14, wherein the selection protocol is a round robin selection protocol.

16. The system of claim 9, wherein the cache controller is further configured to:
determine, after evicting the first cache line, that a second cache line is to be evicted from the first LLC partition;
send, based on the determination, a second notification to each of the plurality of LLC partitions;
receive, in response to the second notification, one busy indication from each of the plurality of LLC partitions;
update each available victim cache register portion of an available victim cache register to indicate that each of the plurality of LLC partitions are busy; and
evict the second cache line to the memory.

17. A non-transitory computer readable medium comprising instructions that, when executed by a computer processor, perform a method of evicting a cache line, the method comprising:

determining that a first cache line is to be evicted from a first Last Level Cache (LLC) partition of a plurality of LLC partitions of a partitioned LLC;

sending, based on the determination, a first notification to a second LLC partition of the plurality of LLC partitions;

receiving, in response to the first notification, an available indication indicating that the second LLC partition is available as a designated victim cache partition, wherein the second LLC partition sends the available indication based on making a first determination that that a value describing the availability of the second LLC partition is within a threshold;

performing a selection of the second LLC partition as the designated victim cache; and evicting the first cache line to the second LLC partition based on the selection.

18. The non-transitory computer readable medium of claim 17, wherein the first determination comprises:

making, after receiving the first notification, a second determination that an outstanding accesses threshold has not been exceeded;

making a third determination that a candidate victim cache line has not been accessed within a time-of-last-access threshold; and making a fourth determination that the candidate victim cache line has not been accessed more than an access frequency threshold.

19. The non-transitory computer readable medium of claim 17, wherein the method of the instructions further comprises:

updating, based on the available indication and before the selection, an available victim cache register portion of an available victim cache register to indicate that the second LLC partition is available as the designated victim cache partition, wherein the available victim cache register portion corresponds to the second LLC partition.

20. The non-transitory computer readable medium of claim 19, wherein the method of the instructions further comprises:

sending, before the selection, the first notification to other LLC partitions of the plurality of LLC partitions;

receiving, from the other LLC partitions and in response to sending the first notification to the other LLC partitions, a plurality of indications comprising a plurality of available indications and a plurality of busy indications, wherein each of the plurality of available indications indicate that one of the other LLC partitions is available as the designated victim cache partition and each of the plurality of busy indications indicate that one of the other LLC partitions is not available as the designated victim cache partition; and updating, before the selection and based on the plurality of indications, a plurality of other available victim cache register portions of the available victim cache register, wherein the selection is performed using a selection protocol and the available victim cache register.

* * * * *

UNITED STATES PATENT AND TRADEMARK OFFICE
CERTIFICATE OF CORRECTION

| | | |
|---|---|---|
| PATENT NO. | : 9,836,406 B2 | Page 1 of 1 |
| APPLICATION NO. | : 14/978007 | |
| DATED | : December 5, 2017 | |
| INVENTOR(S) | : Leung et al. | |

It is certified that error appears in the above-identified patent and that said Letters Patent is hereby corrected as shown below:

In the Specification

Column 7, Line 50, delete "the a" and insert -- a --, therefor.

In the Claims

Column 17, Lines 10-11, Claim 17, delete "that that" and insert -- that --, therefor.

Signed and Sealed this
Tenth Day of July, 2018

Andrei Iancu
*Director of the United States Patent and Trademark Office*